(12) United States Patent
Kamiya et al.

(10) Patent No.: US 7,256,746 B2
(45) Date of Patent: Aug. 14, 2007

(54) MOLDED COMPONENT FOR BEAM PATH OF RADAR APPARATUS

(75) Inventors: Itsuo Kamiya, Toyota (JP); Koichi Tanaka, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 254 days.

(21) Appl. No.: 11/042,070

(22) Filed: Jan. 26, 2005

(65) Prior Publication Data

US 2005/0181531 A1 Aug. 18, 2005

(30) Foreign Application Priority Data

Feb. 2, 2004 (JP) ............................. 2004-025803
Sep. 7, 2004 (JP) ............................. 2004-259823

(51) Int. Cl.
*H01Q 1/32* (2006.01)
*H01Q 1/42* (2006.01)

(52) U.S. Cl. ...................................... 343/713; 343/872

(58) Field of Classification Search ................ 343/711, 343/713, 872
See application file for complete search history.

(56) References Cited

U.S. PATENT DOCUMENTS

| | | |
|---|---|---|
| 6,184,842 B1 | 2/2001 | Leinweber et al. |
| 6,328,358 B1 | 12/2001 | Berweiler |
| 6,777,610 B2 * | 8/2004 | Yamada et al. .............. 136/251 |
| 6,961,023 B2 * | 11/2005 | Fujii et al. .................. 343/713 |
| 2002/0063243 A1 * | 5/2002 | Matsumoto et al. ........ 252/585 |

FOREIGN PATENT DOCUMENTS

| | | |
|---|---|---|
| DE | 198 55 450 A1 | 6/2000 |
| EP | 1 505 690 A1 | 2/2005 |
| JP | A-2000-049522 | 2/2000 |
| JP | A-2000-159039 | 6/2000 |
| JP | A-2000-344032 | 12/2000 |
| JP | A-2003-252137 | 9/2003 |

* cited by examiner

Primary Examiner—Shih-Chao Chen
(74) Attorney, Agent, or Firm—Oliff & Berridge, PLC

(57) ABSTRACT

A molded component for the beam path of a radar apparatus with a low radio transmission loss and improved hardness and abrasion resistance is provided. The molded component for the beam path of a radar apparatus comprises a base body 21 composed of a cyclic polyolefin resin layer, and a bright decoration layer 24 disposed on the surface of the base body. Preferably, by disposing a modified layer 22 treated by plasma ion etching and/or highly concentrated ozone water especially on the surface of the cyclic polyolefin resin, wettability on the surface is improved, thereby substantially improving the adhesion to the bright decoration layer.

11 Claims, 6 Drawing Sheets

CYCLIC POLYOLEFIN
TRANSPARENT BASE BODY

PLASMA MODIFIED
LAYER

Sn BRIGHT
DECORATION LAYER

CYCLIC POLYOLEFIN
TRANSPARENT BASE BODY

PLASMA MODIFIED
LAYER

BLACK
DECORATION LAYER

MOLDED COMPONENT FOR BEAM PATH OF RADAR APPARATUS

BACKGROUND OF THE INVENTION

1. Field of the Invention

The present invention relates to a molded component for protecting a radar apparatus, especially to a molded component for the beam path of a radar apparatus disposed behind the front grill of an automobile.

2. Background Art

In general, antennas that transmit and receive radio waves in communication devices, radar devices, and the like have rarely been restricted in terms of the design of their bodies and peripheral structures, since their functions have been given priority. For example, a rod antenna whose shape is exposed is used for automobile radio antennas and the like. There may be a case where the antenna is hopefully hidden depending on the location in which the antenna is attached. For example, in a radar system or the like that measures obstacles in front of an automobile and the distance between automobiles, the antenna is preferably disposed in a central position at the front of the automobile in order to make the most of its performance. In this case, although the antenna is likely to be installed near the front grill of automobile, it is preferable that it not be possible to view the antenna from the outside in terms of design.

An auto cruise system involves technology for controlling the distance between vehicles by accelerating or decelerating one's own vehicle, in which a sensor mounted in the front of the vehicle measures the distance and a relative speed between a vehicle in front and one's own vehicle, and the throttle and brakes are controlled based on this information. The auto cruise system has recently attracted attention as one of the core technologies of the intelligent transportation system (ITS) for easing traffic congestion and decreasing traffic accidents. In general, a radio transmitter-receiver device such as a millimeter-wave radar is used as a sensor for the auto cruise system.

As shown in FIG. 7, a radar apparatus 100 mounted in an automobile is usually disposed behind a front grill 101. An emblem 102 of an automobile manufacturer or a specific decoration is disposed on the front grill 101. Millimeter waves from the radar apparatus are radiated forward via the front grill and the emblem, and reflections from an object return to the radar apparatus via the front grill and the emblem.

Therefore, it is preferable to use materials and paints that provide low radio transmission loss and a predetermined appearance for the front grill and the emblem, especially where the beam path of a radar apparatus is arrayed.

In this manner, a radio transmitter-receiver device is generally disposed behind the back surface of the front grill of a vehicle. However, there are many cases where the front grill is metal plated, so that it is difficult to transmit radio waves satisfactorily through the highly conductive metal. Also, front grills have a structure where air holes for taking in air are disposed, and front grills do not have uniform thicknesses. Therefore, when radio waves pass in and out through such a front grill, there is a difference in a radio transmission speed between the thin portion and the thick portion of the front grill, so that it is difficult to obtain good radar sensitivity.

On account of these reasons, in general, a window portion that is capable of transmitting radio waves is disposed in a portion of the front grill that corresponds to the portion where the radio transmitter-receiver device is disposed. When the window portion is disposed in the front grill, radio waves can pass in and out through the window portion. However, by including a window portion, the appearance of the front grill loses continuity and the appearance of the vehicle may be spoiled, since the internal portions of the vehicle, such as the radio transmitter-receiver device and the engine area, are viewed.

Therefore, conventionally, unity is provided between the window portion and the front grill body by inserting a radio transmission cover as disclosed in JP Patent Publication (Kokai) No. 2000-159039 A into the window portion of the front grill, for example. The radio transmission cover as disclosed in JP Patent Publication (Kokai) No. 2000-159039 A is formed by laminating a plurality of resin layers formed with concavity and convexity. This covering component can provide an impression by a metal layer deposited with concavity and convexity between the resin layers such that the fin member of the front grill continuously exists in the radio transmission cover.

Indium is used as a metal deposited in such a radio transmission cover. When depositing indium on a deposit member, indium is not deposited on the surface of the deposit member in a uniform film manner, but deposited in a minute insular manner. In other words, when indium is deposited on the deposit member, the surface of the deposit member has a minute mixture of a deposit portion where indium is deposited in a minute insular manner and a non-deposit portion where nothing is deposited. In this case, radio waves can pass in and out through the non-deposit portion and the surface of the deposit member can be recognized upon viewing as a member that has metallic luster, since the deposit portion has indium deposited in a minute insular manner.

However, as indium is an expensive metallic material, the increased material cost when the deposition is performed using indium is problematic. Moreover, it is difficult to form the deposited portion and the non-deposited portion in a well-balanced manner. For example, there is a case where radio waves do not pass in and out satisfactorily when the deposit portions are formed extremely closely together.

JP Patent Publication (Kokai) No. 2003-252137A discloses a method for manufacturing a radio transmission cover in order to enable processing of a metallic film using various metallic materials in addition to indium, and to provide a method for manufacturing a radio transmission cover in which radio waves pass in and out satisfactorily. The method comprises a first step for forming a cover base member in a planar table manner, a second step for forming the metallic film on one surface of the cover base member such that the shape of the metallic film corresponds to the shape of the aforementioned fin portion, a third step for forming a bright portion in an insular manner by physically or chemically removing a part of the metallic film, and a fourth step for forming a transparent resin layer on the upper layer of a plane where the bright portion of the cover base member is formed. The radio transmission cover is disposed on the front grill of a vehicle, the front grill having a reticular fin portion, and a radio transmitter-receiver device is disposed on the back surface side thereof.

JP Patent Publication (Kokai) No. 2000-159039 A and JP Patent Publication (Kokai) No. 2000-49522 A disclose a thin metallic layer comprising indium deposited on a metal portion area that can be viewed from the outside at a plastic-plated member for the beam path of a radar apparatus. However, it is necessary to ensure a bright design and the reliability of durability for radio transmittance by forming a stable protective layer so as not to allow the indium bright film layer to undergo exfoliation or be damaged by an external force, or to be corroded by an external environmental stress such as water or polluted air.

This is due to the following facts: indium is a very soft metallic material with a value of 1.2 in the Mohs hardness scale; indium corrodes under the aforementioned environmental stress since it is basically a metallic material; it is necessary to ensure the reliability of durability by securing the film thickness with certainty such that the bright-effect design of indium can be obtained without thickening the indium film layer more than is necessary since a radio transmission loss occurs as a conductivity loss based on the fact that indium is basically a metallic material; and the indium layer melts due to the heat of molten resin when successively conducting secondary formation of the lining resin on a resin-molded component in which a film is formed on the surface of a base body in advance, since the melting point of indium is 156° C., which is extremely low, for example.

JP Patent Publication (Kokai) No. 2000-344032 A discloses a ceramic film comprising silicon dioxide disposed as a protective layer for preventing exfoliation and ensuring anticorrosion of an indium film.

Meanwhile, an armoring component of a radar apparatus that has metallic luster is required to be resistant to attenuation of radio wave intensity so as to prevent the radar apparatus from receiving radio waves erroneously. In other words, it is necessary to minimize refraction and reflection of radio waves among members and at a metallic film in order to prevent the attenuation of radio waves in the armoring component per se.

JP Patent Publication (Kokai) No. 2002-135030 A discloses an armoring component for vehicles in terms of order to provide a radio-transmitting armoring component that is good in radio transmittance while having a design featuring a metallic luster. The armoring component for vehicles comprises an outer covering board composed of a radio-transmitting and transparent material, a metallic film formed in the inside portion of the outer covering board, and a back covering board composed of a radio-transmitting material. In the armoring component for vehicles, the relative dielectric constant of materials that constitute the outer covering board and the back covering board are substantially the same. In general, refraction and reflection of radio waves are likely to occur at the interface of different types of materials in proportion to the increase in the difference of the relative dielectric constants among the materials. The present invention thus can minimize the refraction and reflection of radio waves between the outer covering board and the back covering board in the radio-transmitting armoring component by using an outer covering board and a back covering board whose relative dielectric constants are substantially the same, thereby improving the radio transmission properties of the radio-transmitting armoring component. Specifically, examples of materials of the outer covering board include polycarbonate (PC) or polymethyl methacrylate (PMMA), and examples of materials of the back covering board include syndiotactic polystyrene, polyphenylene ether (PPE), polyvinyl chloride (PVC), and acrylonitrile/butadiene/styrene copolymer (ABS).

However, the board thickness of polycarbonate disclosed as the materials of outer covering board of a metallic layer in the aforementioned Patent Document 5 requires a thick design in light the need to reduce the amount of transmission attenuation of millimeter radio waves. The thickness of a transparent polycarbonate resin is about 3.5 mm when the value of the radio transmission attenuation is minimized in the 76 GHz band of millimeter waves. Even a board with a thickness of 3.5 mm or less can maintain its function if the radio transmission properties are not taken into account. However, in the design for disposing the molded component, it is an object to reduce the board thickness in order to increase the degrees of freedom for the design and also to reduce the mass. In other words, the performance of the component can be improved and the degrees of freedom for the design can be increased by employing materials for the resin layer with smaller transmission attenuations regarding millimeter radio waves.

SUMMARY OF THE INVENTION

Polycarbonate (PC) or polymethyl methacrylate (PMMA) disclosed as the outer covering board of a metallic layer in the aforementioned Patent Document 5 results in high radio transmission loss. Also, the metallic layer requires further improvement in durability and abrasion resistance, for example. Moreover, the adhesion of a bright decoration layer requires improvement.

In view of the aforementioned problems in the prior art, it is an object of the present invention to provide a molded component for the beam path of a radar apparatus with low radio transmission loss. It is also an object of the present invention to provide a molded component that shows a bright color for the beam path of a radar apparatus. It is further an object of the present invention to provide a molded component for the beam path of a radar apparatus in which the adhesion of a bright decoration layer that shows a bright color is improved.

The inventors found that the aforementioned objects could be achieved by using a specific resin for a base body and arrived at the present invention.

The present invention is an invention of a molded component for the beam path of a radar apparatus. The present invention comprises a base body composed of a cyclic polyolefin resin layer, and a bright decoration layer disposed on the surface of the base body.

Preferably, the bright decoration layer is indium and/or an indium alloy, tin and/ or a tin alloy, or a ceramic material.

Preferable examples of the aforementioned tin and/or a tin alloy include tin (Sn) alone or an alloy of tin (Sn) and one or more elements selected from indium (In), gallium (Ga), antimony (Sb), and bismuth (Bi).

Preferable examples of the aforementioned ceramic material include nitride ceramics, oxide ceramics, carbide ceramics, and a mixture of these ceramics.

Preferably, a paint layer for enhancing the tone of color expressed by the aforementioned ceramic materials is disposed between the aforementioned base body and the aforementioned ceramic material layer in order to enhance the tone of color expressed by the aforementioned ceramic materials.

Preferably, the surface of the aforementioned cyclic polyolefin resin is treated by plasma ion etching and/or highly concentrated ozone water, since this increases the wettability on the surface and substantially improves the adhesion to the bright decoration layer. It is difficult for the cyclic polyolefin resin to obtain a strong adhesion since the surface of the molded component basically has no functional groups, based on the fact that the cyclic polyolefin resin is a nonpolar material in terms of molecular structure. However, sufficient adhesion can be obtained by the plasma ion etching treatment and/or the highly concentrated ozone water treatment.

As a cyclic polyolefin resin, well-known materials can be widely applied. Polynorbornene resin and/or polycyclohexene resin are preferred among them.

A method for forming the bright decoration layer comprising the aforementioned tin and/or a tin alloy is not limited. Specifically, methods include vacuum film forming methods such as a vacuum deposition method, an ion plating method, and a sputtering method, for example: vapor growth methods such as thermal CVD, plasma CVD, photo CVD, and MOCVD, for example; the LB (Langmuir-Blodgett) method, electroless deposition, the sol-gel method; and the like.

Preferably, each layer that forms the bright decoration layer comprising the aforementioned tin and/or tin alloy has a thickness of 0.1 nm to 1000 nm. Further preferably, the thickness is 1 nm to 500 nm. Particularly preferably, the thickness is 10 nm to 100 nm.

The molded component for the beam path of a radar apparatus according to the present invention can further include a non-transparent resin layer for enhancing the tone of color.

The molded component for the beam path of a radar apparatus can be provided along with reduced radio transmission loss and improved hardness and abrasion resistance by using the cyclic polyolefin resin for the base body. Also, the molded component for the beam path of a radar apparatus can be provided along with improved wettability on the surface of the base body comprising the cyclic polyolefin resin layer and with a substantially improved ability to adhere to the bright decoration layer, by using the cyclic polyolefin resin as the base body, the cyclic polyolefin resin being treated by plasma ion etching and/or highly concentrated ozone water.

DESCRIPTION OF THE PREFERRED EMBODIMENTS

Figure 1:
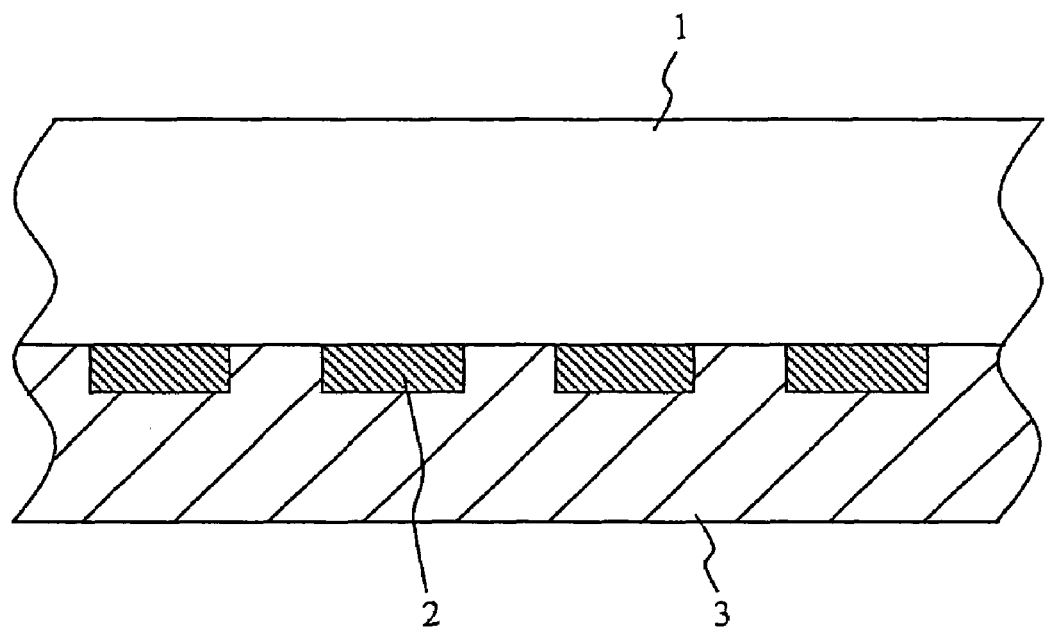
FIG. 1 shows a cross section of the surface area of the molded component for the beam path of a radar apparatus according to the present invention.

FIG. 1 shows an example of a cross section of the surface of the molded component for the beam path of a radar apparatus according to the present invention. On the surface of a base body 1 comprising a cyclic polyolefin resin, a bright decoration layer 2 is disposed, and a non-transparent resin layer 3 for enhancing the tone of color is formed.

Figure 2:
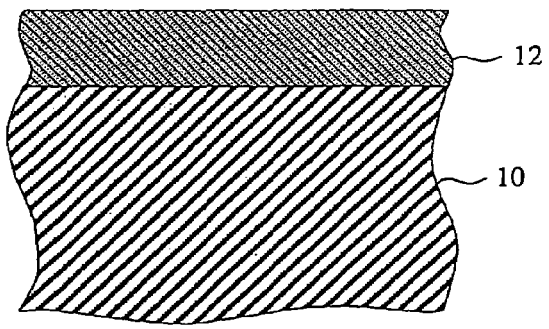
FIG. 2 shows another cross section of the surface area of the molded component for the beam path of a radar apparatus according to the present invention.
Figure 2:
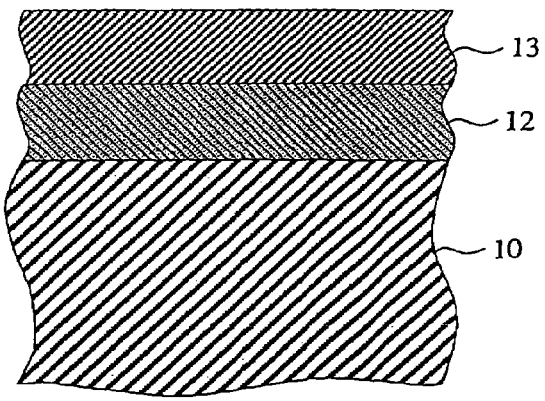
Figure 2:
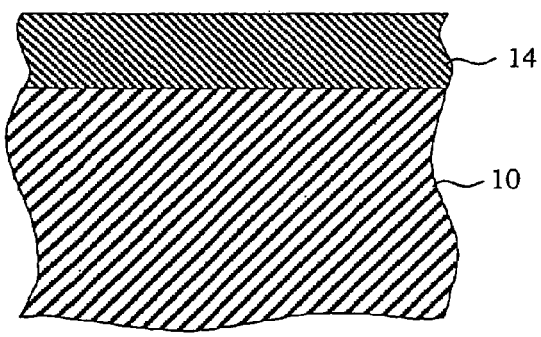
Figure 2:
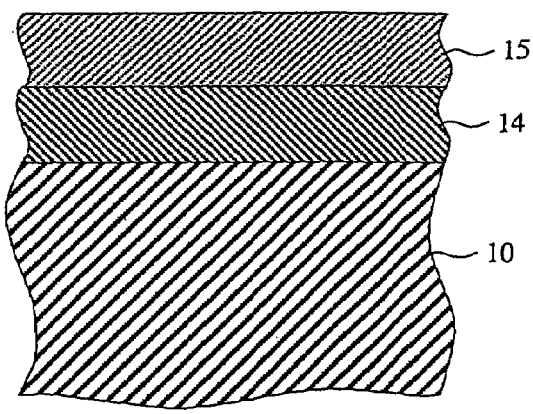

FIG. 2 shows another example of a cross section on the surface of the molded component for the beam path of a radar apparatus according to the present invention. Although tin and/or a tin alloy are used for descriptive purposes in the following example, the bright decoration layer according to the present invention is not limited to tin or a tin alloy. Various types of materials such as indium, ceramics, and the like can also be applied.

FIG. 2A shows a second example of the present invention. The molded component of the example comprises a base body 10 and a bright decoration layer 12 disposed thereon, the bright decoration layer being composed of tin.

FIG. 2B shows a third example of the present invention. In the molded component of the example, the bright decoration layer has a multilayered structure. The molded component comprises a base body 10, a first bright decoration layer 12 composed of tin disposed thereon, and a second bright decoration layer 13 composed of tin and/or a tin alloy disposed thereon. By employing a multilayered structure for the bright decoration layer, an appearance that shows a metallic color and a rainbow-like interference color can be obtained.

FIG. 2C shows a fourth example of the present invention. The molded component of the example comprises a base body 10 and a bright decoration layer 14 composed of a tin alloy disposed thereon. FIG. 2D shows a fifth example of the present invention. The molded component of the example comprises a base body 10, a first bright decoration layer 14 composed of a tin alloy disposed thereon, and a second bright decoration layer 15 composed of tin disposed thereon.

The bright decoration layers 12 and 15 composed of tin, and bright decoration layers 13 and 14 composed of a tin alloy, may be formed by a vacuum deposition method. Preferably, each layer used to form the bright decoration layer has a thickness of 1 nm to 500 nm. Further preferably, the thickness is 10 nm to 100 nm.

A desired color can be expressed by suitably selecting the types of the materials and the thickness of the layers that constitute the bright decoration layers 12 and 15 composed of tin, and the bright decoration layers 13 and 14 composed of a tin alloy.

The base body 10 is composed of a material that is provides low radio transmission loss and is superior in terms of dielectric properties. Relative permittivity $\epsilon'$ and dielectric loss tan $\delta$, for example, provide an indication of the dielectric property. The base body 10 is composed of a transparent resin, preferably a cyclic polyolefin resin.

Figure 3:
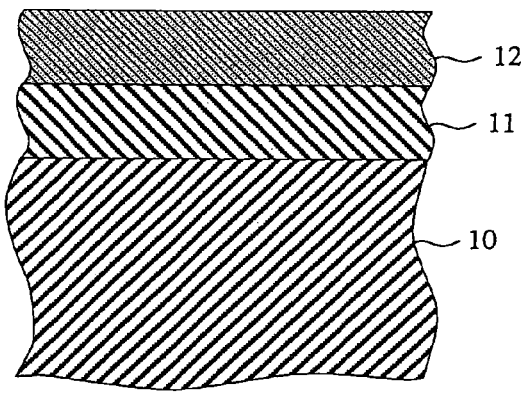
FIG. 3 shows another cross section of the surface area of the molded component for the beam path of a radar apparatus according to the present invention.
Figure 3:
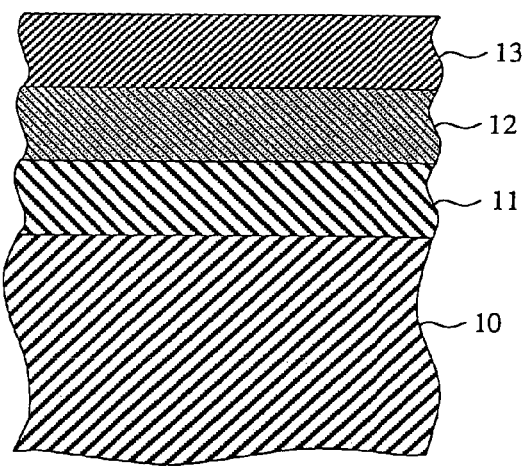
Figure 3:
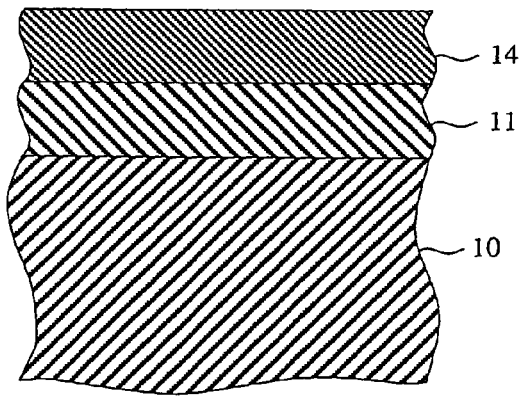
Figure 3:
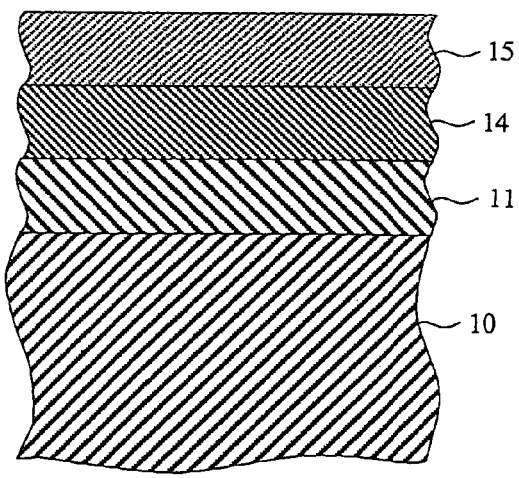

Other examples of the present invention are described with reference to FIG. 3. Although, ceramics are used to describe the following examples, the bright decoration layer according to the present invention is not limited to these ceramics. Various types of materials such as Tin and/or a tin alloy, indium, and the like can also be applied to.

FIG. 3A shows a sixth example of the present invention. The molded component of the example comprises a base body 10, an undercoat layer 11 disposed thereon, and a ceramic layer 12 disposed thereon. The ceramic layer 12 may be composed of nitride ceramics, oxide ceramics, or carbide ceramics. The nitride ceramics include titanium nitride TiN, aluminum nitride AlN, chromium nitride CrN, silicon nitride $Si_3N_4$, iron nitride FeN, gallium nitride GaN, zirconium nitride ZrN, and the like. The carbide ceramics include silicon carbide SiC, titanium carbide TiC, zirconium carbide Zrc, boron carbide $B_4C$, tungsten carbide WC, and the like. In the example, the ceramic layer 12 preferably comprises titanium nitride TiN or aluminum nitride AlN. The molded component of the example differs from the example of FIG. 2A in that the undercoat layer 11 is disposed. The undercoat layer 11 comprises a paint for enhancing a tone of color expressed by the ceramic layer 12, and a paint of a desired color is selected. If the ceramic layer 12 employs the metallic color such as titanium nitride TiN, the undercoat layer 11 may be a black paint.

FIG. 3B shows a seventh example of the present invention. The molded component of the example comprises a base body 10, an undercoat layer 11 disposed thereon, a first ceramic layer 12 disposed thereon, and a second ceramic layer 13 disposed thereon. The two ceramic layers 12 and 13 comprise two types of ceramic materials that are different from each other, the two types of ceramic materials being selected from ceramic materials including the aforementioned nitride ceramics, oxide ceramics, and carbide ceramics. Preferably, the ceramic materials are titanium nitride TiN and aluminum nitride AlN. Further preferably, the lower first ceramic layer 12 is a titanium nitride TiN layer and the upper second ceramic layer 13 is an aluminum nitride AlN layer. In this manner, an appearance that shows a metallic color and a rainbow-like interference color can be obtained by forming the aluminum nitride AlN layer that is transparent and shows the rainbow-like interference color on the titanium nitride TiN layer that shows the metallic color. The molded component of the example differs from an example of FIG. 2B in that the undercoat layer 11 is disposed.

FIG. 3C shows an eighth example of the present invention. The molded component of the example comprises a base body 10, an undercoat layer 11 disposed thereon, and a mixture-of-ceramic-material layer 14 disposed thereon. The molded component of the example comprises the base body 10 and the mixture-of-ceramic-material layer 14 disposed thereon. The mixture-of-ceramic-material layer 14 comprises a mixture of two or more ceramic materials. Although the examples of ceramic materials that constitute the mixture are as mentioned above, the ceramic materials are preferably titanium nitride TiN and aluminum nitride AlN. The molded component of the example differs from an example of FIG. 2C in that the undercoat layer 11 is disposed.

FIG. 3D shows a ninth example of the present invention. The molded component of the example comprises a base body 10, an undercoat layer 11 disposed thereon, a first mixture-of-ceramic-material layer 14 disposed thereon, and a second mixture-of-ceramic-material layer 15 disposed thereon. The two mixture-of-ceramic-material layers 14 and 15 comprise ceramic material compositions, the ceramic compositions being different from each other. The examples of ceramic materials that constitute each mixture are as mentioned above. However, preferably, titanium nitride TiN and aluminum nitride AlN are used. In this case, the content of titanium nitride TiN and aluminum nitride AlN differentiates the two mixture layers 14 and 15 from each other. The molded component of the example differs from the example of FIG. 2D in that the undercoat layer 11 is disposed.

The ceramic layers 12 and 13 and the mixture-of-ceramic-material layers 14 and 15 may be formed by sputtering. Preferably, the ceramic layers 12 and 13 and the mixture-of-ceramic-material layers 14 and 15 have thicknessws of 0.1 nm to 1000 nm. Further preferably, each thickness is 10 nm to 500 nm.

A desired color can be expressed by suitably selecting the types of ceramic materials and the thickness of the layers that constitute the ceramic layers 12 and 13, and the mixture-of-ceramic-material layers 14 and 15.

The base body 10 is composed of a cyclic polyolefin resin that provides low radio transmission loss and is superior in terms of dielectric properties.

In the present invention, the wettability on the surface of the base body comprising the cyclic polyolefin resin layer is improved and the ability to adhere to the bright decoration layer is substantially improved by the plasma etching treatment and/or the highly concentrated ozone water treatment.

Figure 4:
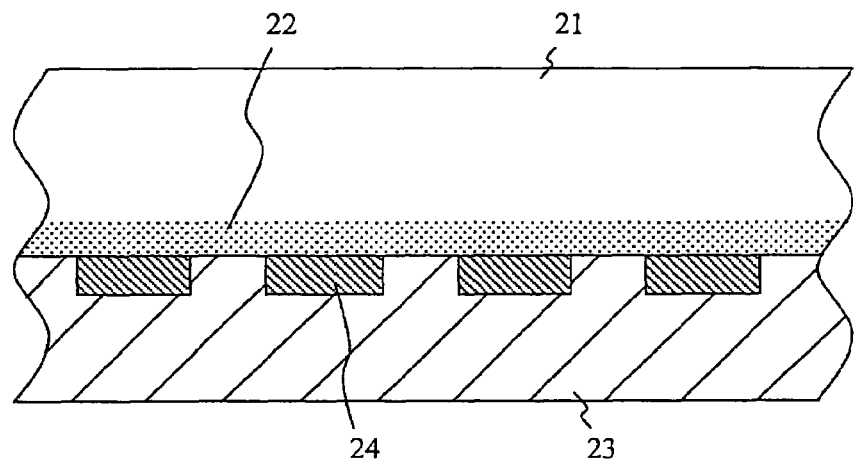
FIG. 4 shows another cross section of the surface area of the molded component for the beam path of a radar apparatus according to the present invention.

FIG. 4 shows another example of a cross section of the surface of the molded component for the beam path of a radar apparatus according to the present invention. On the surface of a transparent base body 21 comprising a cyclic polyolefin resin, a modified layer 22 exists, the modified layer 22 being subjected to the plasma etching treatment and/or highly concentrated ozone water treatment, and a bright decoration layer 24 is disposed via the modified layer 22. Moreover, a non-transparent resin layer 23 for enhancing the tone of color is formed. Examples of the bright decoration layer according to the present invention include but are not limited to tin and/or a tin alloy. Various materials such as indium, ceramics, and the like can also be applied.

In the plasma etching treatment used in the present invention, the surface of the cyclic polyolefin resin layer is etched by a physical etching mechanism using ions and radicals generated in plasma, and the cyclic polyolefin resin layer is etched in a different direction by electrically accelerating the ion speed and then by bringing ions to the surface of the cyclic polyolefin resin layer.

In order to treat the cyclic polyolefin resin layer with an ozone solution, the cyclic polyolefin resin layer is immersed in the ozone solution in which ozone is dissolved, or the surface of the cyclic polyolefin resin layer is sprayed with the ozone solution. Although water is usually used as a solvent for the ozone solution, preferably, an organic or inorganic polar solvent is used as the solvent for the ozone solution. This can further reduce treatment time.

The ozone concentration in the ozone solution has a great impact on the activation on the surface of a resin material. While the effect of the activation can be observed from about 10 ppm, the effect of the activation significantly increases at not less than 50 ppm, and the treatment can be carried out in a shorter time at not less than 100 ppm. Preferably, the ozone concentration is high since the activation effect on the surface of the resin material is not sufficient when the ozone concentration is low. Also preferably, the time of ozone solution treatment is 2 to 10 minutes. When the time is less than 2 minutes, the activation on the surface of the resin material is not sufficient, and when the time exceeds 10 minutes, the resin material might be degraded.

For a method for producing ozone water, especially the highly concentrated ozone water used in the present invention, well known methods can be used. Examples of the methods include use of equipment for producing ozone water with an absorption tower. In the equipment, a water inlet and an exhaust gas outlet are disposed in the upper portion of a gas absorption portion, and an ozone-containing gas inlet and an ozone water outlet are disposed in the lower portion of the gas absorption portion. The gas flow of the gas absorption portion in which the gas phase is continuous is divided or inflected in the gas flow path to form an assembly of gas flow paths. Water and ozone-containing gas are brought into contact so as to obtain highly concentrated ozone water via counterflow.

Although water is usually used as a solvent for the ozone solution, preferably, the solvent is an organic or inorganic polar solvent. Examples of the organic polar solvent include alcohols such as methanol, ethanol, isopropyl alcohol, and the like; organic acids such as N,N-dimethylformamide, N,N-dimethylacetamide, dimethyl sulfoxide, N-methylpyrrolidone, hexamethylphosphoramide, formic acid, acetic acid, and the like; and a mixture of these materials with water or alcoholic solvents. Examples of the inorganic polar solvent include inorganic acids such as nitric acid, hydrochloric acid, hydrofluoric acid, and the like.

The cyclic polyolefin resins, such as polynorbornene resin or polycyclohexene resin, that can be used for the base body in the present invention have superior properties in transparency since they are amorphous.

The cyclic polyolefin resin used in the present invention is polyolefin that includes a repeating unit that has a saturated alicyclic structure. Although a portion may include unsaturated bonds, preferably, it is polyolefin that includes a repeating unit that has a saturated alicyclic structure. Examples of the alicyclic structure include a cycloalkane structure, a cycloalkene structure, and the like. Preferably, the alicyclic structure is the cycloalkane structure. The number of carbon atoms that constitute the alicyclic structure is 4 to 30, preferably 5 to 20, and further preferably 5 to 15. Examples of monomers used for materials for the cyclic polyolefin include norbornene, cyclohexene, vinylcyclohexane, an alkyl derivative thereof, an alkylidene derivative thereof, and the like.

Specific examples of norbornene and derivatives thereof include 5-methyl-2-norbornene, 5,6-dimethyl-2-norbornene, 5-ethyl-2-norbornene, 5-butyl-2-norbornene, 5-ethylidene-2-norbornene, dicyclopentadiene, 2-3-dihydrodicyclopentadiene, alkyl derivatives thereof such as methyl, ethyl, propyl, butyl, and the like, and polar radical derivatives thereof such as halogen and the like; dimethano octahydronaphthalene, an alkyl derivative thereof, an alkylidene derivative thereof, and a polar radical derivative such as halogen and the like, such as 6-methyl-1,4:5,8-dimethano-1,4,4a,5,6,7,8,8a-octahydronaphthalene, 6-ethyl-1,4:5,8-dimethano-1,4,4a,5,6,7,8,8a-octahydronaphthalene, 6-ethylidene-1,4:5,8-dimethano-1,4,4a,5,6,7,8,8a-octahydronaphthalene, 6-chloro-1,4:5,8-dimethano-1,4,4a,5,6,7,8,8a-octahydronaphthalene, 6-cyano-1,4:5,8-dimethano-1,4,4a,5,6,7,8,8a-octahydronaphthalene, 6-pyridyl-1,4:5,8-dimethano-1,4,4a,5,6,7,8,8a-octahydronaphthalene, 6-methoxycarbonyl-1,4:5,8-dimethano-1,4,4a,5,6,7,8,8a-octahydronaphthalene, and the like; and trimers and tetramers of cyclopentadiene such as 4,9:5,8-dimethano-3a,4,4a,5,8,8a,9,9a-octahydro-1H-benzoindene, 4,11:5,10:6,9-trimethano-3a,4,4a,5,5a,6,9,9a,10, 10a,11,11a-dodecahydro 1H-cyclopentaanthracene, and the like.

Examples of cyclic polyolefin include the following.

(a) Saturated cycles gained by hydrogenating a ring-opening polymer via a normal hydrogenation method, the ring-opening polymer being gained by polymerizing the aforementioned monomers via a well known ring-opening polymerization method.

(b) Copolymers of the aforementioned cyclic olefin and ethylene.

(c) Saturated cycles gained by hydrogenating homopolymers of monomers induced by 1,3-cyclopentadiene, 1,3-cyclohexadiene, 1,3-cycloheptadiene, 1,3-cyclooctadiene, and substituent derivatives thereof, and the like, and cyclohexadiene monomer polymers via a normal hydrogenation method, the cyclohexadiene monomer polymers being copolymers comprising the aforementioned monomers and other monomers such as chain conjugated diene monomer units induced by 1,3-butadiene, isoprene, 1,3-pentadiene, 1,3-hexadiene, and the like, and/or vinyl aromatic monomer units induced by styrene, α-methylstyrene, o-methylstyrene, p-methylstyrene, p-tert butylstyrene 1,3-dimethylstyrene, divinylbenzene, vinylnaphthalene, diphenylethylene, vinylpyridine, and the like.

(d) Saturated cycles gained by hydrogenating homopolymers of the aforementioned vinyl aromatic monomers and copolymers of vinyl aromatic monomers and polar vinyl monomer units via a normal hydrogenation method, the polar vinyl monomer units being induced by chain conjugated diene and/or methyl methacrylate, methyl acrylate, acrylonitrile, methyl vinyl ketone, α-methyl cyanoacrylate, and the like. One or two types or more of these cyclic olefin copolymers can be used via blending.

Moreover, other polymers can be combined with the cyclic polyolefin resin used in the present invention if required. Examples of the other polymers include rubbers and other thermal plastic resins. Examples of the rubbers include natural rubber, polybutadiene rubber, polyisoprene rubber, acrylonitrile-butadiene copolymer rubber, styrene-butadiene copolymer rubber, styrene-isoprene copolymer rubber, styrene-butadiene-isoprene copolymer rubber, hydrogenated diene rubber, saturated polyolefin rubber such as ethylene α-olefin copolymers of ethylene-propylene copolymers, ethylene-propylene-diene copolymers, α-olefin diene copolymers, urethane rubber, silicone rubber, polyether rubber, acryl rubber, styrene-butadiene-styrene block copolymer rubber, thermal plastic elastomer such as styrene-isoprene-styrene block copolymer rubber, hydrogenated thermal plastic elastomer, urethane thermal plastic elastomer, polyamide thermal plastic elastomer, 1,2-polybutadiene thermal plastic elastomer, and the like.

Examples of other thermal plastic resins include polyolefin such as low-density polyethylene, high-density polyethylene, LLDPE, very low-density polyethylene, polypropylene, syndiotactic polypropylene, polybutene, polypentene, and the like, polyester such as polyethylene terephthalate, polybutylene terephthalate, and the like, polyamide such as nylon 6, nylon 66, and the like, ethylene ethyl acrylate copolymers, ethylene vinyl acetate copolymers, polystyrene, syndiotactic polystyrene, polyphenylene sulfide, polyphenylene ether, aromatic polyamide, polycarbonate, and the like. One or two types or more of these other thermal plastic resins can be combined. The amount of blending is such that radio transmittance, durability, and abrasion resistance that the cyclic polyolefin resin has are not lost; namely, not more than 50% by mass and preferably not more than 30% by mass relative to the cyclic polyolefin resin.

Additives can be combined with the cyclic polyolefin resin if required. Examples of the additives include antioxidant, ultraviolet absorbent, lubricant, anti-fogging agent, anti-mist agent, plasticizer, pigments, near-infrared absorbent, antistatic agent, and the like.

A molded body of the cyclic polyolefin resin can be manufactured by methods that are usually carried out, such as melt molding, solvent casting, and the like. Examples of the melt molding include melt extrusion such as T-die, inflation molding, and the like, a calendar method, thermal pressing, injection molding, and the like. In the solvent casting, a liquid body in which individual components are dissolved or dispersed in a solvent is cast on a support, and then the solvent is dried. Examples of the solvent used for the method include aromatic hydrocarbon such as toluene, xylene, mesitylene, and the like, alicyclic hydrocarbon such as cyclohexane, decalin, and the like, and halogen compounds such as methylene chloride, chloroform, chlorobenzene, dichlorobenzene, and the like. The concentration of the cyclic polyolefin resin in a liquid substance is usually 0.1 to 60% by mass, preferably, 3 to 45% by mass. Examples of the method for casting the liquid substance on the support include bar coaters, doctor blades, Mayer bars, roll coaters, die coaters, spray, air-knife coat, spin coat, dip coat, and the like. Dry removal of the solvent is conducted by a conventional method, and the solvent is dried such that the content of residual solvent is not more than 5% by mass, preferably, 1% by mass or less, further preferably, 0.5% by mass or less.

Embodiment

In the following, examples and comparative examples are described.

EXAMPLE 1 AND COMPARATIVE EXAMPLE 1 planar test piece with a 2.9 mm thickness and a 150×150 mm section was prepared using a cyclic polyolefin resin (example 1). The quality of appearance on the surface, transmission loss of millimeter radio waves, and mass per unit area are compared with those of a test piece (comparative example 1) that comprises a polycarbonate film base body (base) used in the prior art. A bright decoration layer was prepared by vacuum depositing tin (film thickness was 30 nm).

Figure 5:
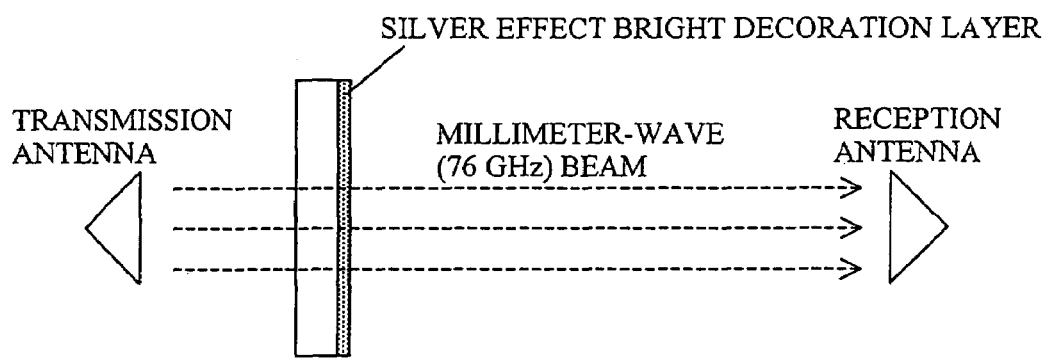
FIG. 5 shows an illustration describing a test method for radio properties.

For radio transmission loss, as FIG. 5 shows, a radio transmission loss was measured by a predetermined method at 76 GHz, which was frequency applied to millimeter-wave radars with radio transmission loss for automobiles. Table 1 shows the performance comparison.

polycarbonate resin component comprising a material in the prior art. In the performance of millimeter-wave radio transmission loss at the 76 GHz band, while the polycarbonate resin comprising a material in the prior art has a 1 dB loss in a 3.5 mm thickness by which the transmission loss reaches the minimum value, the cyclic polyolefin resin according to the present invention has no loss even in a 2.9 mm thickness. It is learned that the board thickness of the resin can be thin while reducing the radio transmission loss thereby improving the performance as a component. By thinning the board thickness, a compact design for the component is possible. Moreover, the mass can be reduced. A comparison of mass per unit area shown in Table 1 indicates a reduction effect of more than 30%. This is not only a mere effect of the reduced board thickness but also an effect of decreased specific gravity of materials. Namely, the specific gravity of polycarbonate is 1.2, and the specific gravity of the cyclic polyolefin resin is 1.0.

Also, it is learned from the result of Table 2 that the untreated cyclic polyolefin resin has a remarkably small amount of attenuation of millimeter radio waves at each incidence angle as compared with the untreated polycarbonate resin.

TABLE 1

| | | | | Performance of resin board | | |
|---|---|---|---|---|---|---|
| | Resin material | Resin thickness (mm) | Thickness of Sn bright decoration layer (nm) | Appearance of surface | Transmission loss of millimeter radio waves (dB) | Mass (g/cm$^2$) |
| Example | Cyclic polyolefin resin | 2.9 | 0 | Transparent | 0 | 0.29 |
| | | | 30 | Bright silver effect | 0.7 | |
| Comparative example | Polycarbonate resin | 3.5 | 0 | Transparent | 1 | 0.42 |
| | | | 30 | Bright silver effect | 1.7 | |

Table 2 shows the amount of attenuation of millimeter radio waves at incidence angles from 0 to 25° in an untreated cyclic polyolefin resin and an untreated polycarbonate resin (unit: dB).

TABLE 2

| | Incidence angles | | | | | |
|---|---|---|---|---|---|---|
| | 0° | 5° | 10° | 15° | 20° | 25° |
| Untreated cyclic polyolefin resin Thickness of 3.0 mm | 0.1 | 0.6 | 0.8 | 0.1 | 0 | 0 |
| Untreated polycarbonate resin Thickness of 2.9 mm | 1.8 | 2.3 | 2.6 | 1.9 | 2.1 | 1.9 |

As Table 1 shows, example 1 of the present invention in which the cyclic polyolefin resin is used ensures a good design effect in the quality of bright effect appearance decorated by tin on the surface, which is equivalent to the

EXAMPLE 2 AND COMPARATIVE EXAMINATIONS 1, 2

In example 2, the entire surfaces of planar test pieces comprising cyclic polyolefin resin, the planar test pieces having a 2.9 mm board thickness and a 150×150 mm section, were subjected to plasma ion etching with a mixed gas of oxygen ($O_2$)/methane ($CH_4$) using a reactive ion etching apparatus, and then a test piece (FIG. 6A) on which tin was processed to form a film (film thickness was 30 nm) and a test piece (FIG. 6B) on which a black design coating (film thickness was 30μ) was coated were individually prepared.

Figure 6:
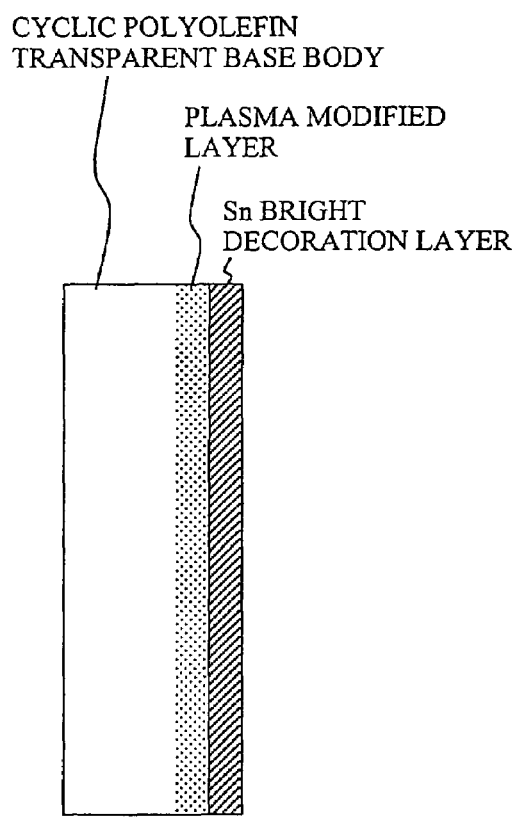
FIG. 6 shows a cross section of samples prepared to examine the adhesion.
Figure 6:
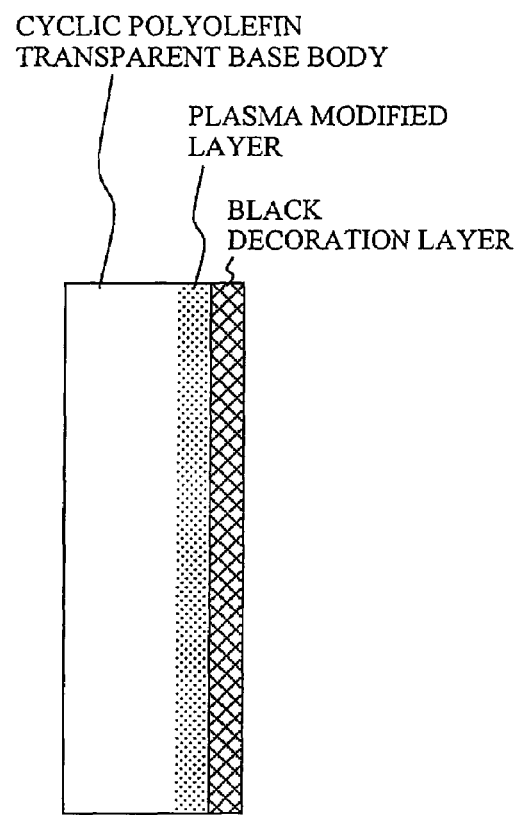
Figure 7:
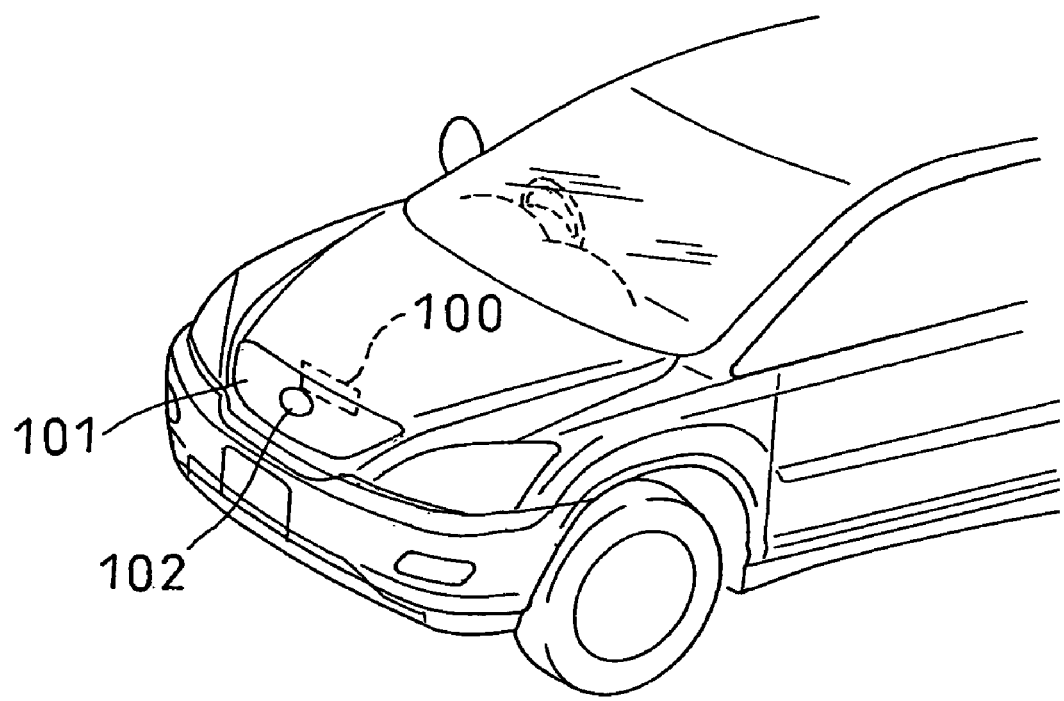
FIG. 7 shows a conceptual diagram of an automobile upon which the radar apparatus is disposed.

Regarding each sample prepared in FIG. 6A and FIG. 6B, the adhesion of the tin (Sn) bright layer and the black coating layer was examined. Also, examinations were conducted to determine whether or not a quality-changed inferior appearance and an increase in transmission loss of millimeter radio waves occur in the transparent resin base bodies, which were problems of incompatible properties as a result of modifying the surface using the plasma etching.

The test method of adhesion of the tin (Sn) bright layer and the black coating layer was based on a cross-cut adhesion test, which was a conventional method for evaluating the adhesion of coating. Namely, the number of peeled cross-cut pieces was examined relative to the total number of cross-cut pieces (100). The evaluation of the examinations regarding the quality-changed inferior appearance in the transparent resin bodies was determined by visually confirming the appearance. The evaluation of an effect of the radio transmission loss on the performance was conducted by examining and evaluating the radio transmission loss at 76 GHz as mentioned above.

A cyclic polyolefin resin base body with an unmodified surface (comparative examination 1), and a polycarbonate resin base body with an unmodified surface (comparative examination 2) were examined using the same methods so that the effect of the example of the invention could be confirmed more clearly. Table 3 shows the results.

TABLE 3

|  | Resin material | Resin thickness (nm) | Thickness of Sn bright decoration layer | Thickness of black coating layer | Performance of resin board | | |
|---|---|---|---|---|---|---|---|
|  |  |  |  |  | Design effect of appearance | Adhesion | Transmission loss of millimeter radio wave (dB) |
| Ex. 2 | Cyclic polyolefin resin with plasma modified surface | 2.9 | 30 nm<br>0 nm | —<br>30 μ | Good<br>Good | 0/100<br>0/100 | 0.7<br>0 |
| Comp. ex. 1 | Cyclic polyolefin resin with unmodified surface | 2.9 | 30 nm<br>0 nm | —<br>30 μ | Unevenly bright<br>Holes | 100/100<br>100/100 | —<br>— |
| Comp. ex. 2 | Polycarbonate resin with unmodified surface | 3.5 | 30 nm<br>0 nm | —<br>30 μ | Good<br>Good | 0/100<br>0/100 | 1.7<br>1 |

As Table 3 shows, the adhesion to the bright decoration layer and the black coating layer can be substantially improved by modifying the surface of the cyclic polyolefin resin.

What is claimed is:

1. A molded component for the beam path of a radar apparatus, comprising a base body composed of a cyclic polyolefin resin layer, and a bright decoration layer composed of ceramic materials disposed on the surface of said base body.

2. The molded component for the beam path of a radar apparatus according to claim 1, wherein said bright decoration layer comprises indium and/or an indium alloy.

3. The molded component for the beam path of a radar apparatus according to claim 1, wherein said bright decoration layer comprises tin and/or a tin alloy.

4. The molded component for the beam path of a radar apparatus according to claim 3, wherein the tin and/or a tin alloy comprises tin (Sn) alone or an alloy of tin (Sn) and one or more elements selected from indium (In), gallium (Ga), antimony (Sb), and bismuth (Bi).

5. The molded component for the beam path of a radar apparatus according to claim 1, wherein the ceramic materials include nitride ceramics, oxide ceramics, carbide ceramics, and a mixture of these ceramics.

6. The molded component for the beam path of a radar apparatus according to claim 1, wherein a color paint layer for enhancing a tone of color expressed by the ceramic materials is disposed between said base body and a layer of the ceramic materials.

7. The molded component for the beam path of a radar apparatus according to claim 1, wherein the surface of the cyclic polyolefin resin layer is treated by plasma ion etching and/or highly concentrated ozone water.

8. The molded component for the beam path of a radar apparatus according to claim 1, wherein the cyclic polyolefin resin layer comprises polynorbornene resin and/or polycyclohexene resin.

9. The molded component for the beam path of a radar apparatus according to claim 1, wherein said bright decoration layer is formed by vacuum deposition or sputtering.

10. The molded component for the beam path of a radar apparatus according to claim 1, wherein said bright decoration layer is formed by individual layers whose thickness is 0.1 nm to 1000 nm.

11. The molded component for the beam path of a radar apparatus according to claim 1, further comprising a non-transparent layer for enhancing a tone of color.

* * * * *